United States Patent [19]

Serratto

[11] E Re. 30,034

[45] Reissued Jun. 19, 1979

[54] LOCAL CONDITIONING INDUCTION-TYPE APPARATUS EMPLOYING PRIMARY INLET AIR AS A POWER MEANS FOR CONTROLLING TEMPERATURE

[75] Inventor: Angelo Serratto, Milan, Italy

[73] Assignee: Marlo S.p.A., Milan, Italy

[21] Appl. No.: 703,390

[22] Filed: Jul. 8, 1976

Related U.S. Patent Documents

Reissue of:

[64] Patent No.: 3,841,398
Issued: Oct. 15, 1974
Appl. No.: 336,181
Filed: Feb. 27, 1973

[30] Foreign Application Priority Data

Mar. 1, 1972 [IT] Italy ..... 21255 A/72

[51] Int. Cl.[2] ..... F24F 3/04; F28F 13/12

[52] U.S. Cl. ..... 165/123; 165/16; 165/37; 236/87

[58] Field of Search ..... 165/123, 16, 37, 122; 236/87, 1 B

[56] References Cited

U.S. PATENT DOCUMENTS

| | | | |
|---|---|---|---|
| 2,109,650 | 3/1938 | Rather | 236/1 B |
| 3,120,344 | 2/1964 | Wood | 165/123 |
| 3,172,463 | 3/1965 | Bowman | 165/123 |
| 3,208,508 | 8/1965 | Bryans | 165/123 |
| 3,213,928 | 10/1965 | Anderson | 165/123 |
| 3,452,811 | 7/1969 | Yerdon | 165/123 |
| 3,470,945 | 10/1969 | Schmidt | 165/123 |
| 3,512,578 | 5/1970 | Honmann | 165/122 |
| 3,623,542 | 11/1971 | Fragnito | 165/123 |
| 3,730,430 | 5/1973 | Osheroff | 236/87 |
| 3,744,556 | 7/1973 | Church | 165/123 |

*Primary Examiner*—Ronald H. Lazarus
*Attorney, Agent, or Firm*—J. Raymond Curtin; Barry E. Deutsch

[57] ABSTRACT

In a conditioning apparatus unit to be used in relation with conditioning systems of the type having four pipes for the secondary water, wherein the temperature is controlled by varying the secondary air flow passing through two heat-exchangers and a by-pass section by means of valve assemblies, the valve assemblies are actuated by the primary air feeding the same apparatus at a pressure value comprised in the range between 15 and 100Kg/m$^2$. Each valve assembly relating to a heat-exchanger is operated by an expansion lung fed by the inlet primary air through a valve controlled by a thermostatic device. A linkage mechanically connects the valve assembly of the by-pass section with the valve assemblies of the heat-exchangers in such a manner that when one of the valve assemblies relating to the heat-exchanger is at least partially open, the other valve assembly is locked in the "close" position and only the by-pass valve assembly can be operated by the said one valve assembly. At each position of either of the two heat-exchangers valve assemblies a given position of the by-pass valve assembly is associated and in particular to the "open" position of one of them the by-pass valve is closed.

9 Claims, 10 Drawing Figures

LOCAL CONDITIONING INDUCTION-TYPE APPARATUS EMPLOYING PRIMARY INLET AIR AS A POWER MEANS FOR CONTROLLING TEMPERATURE

Matter enclosed in heavy brackets [ ] appears in the original patent but forms no part of this reissue specification; matter printed in italics indicates the additions made by reissue.

BACKGROUND OF THE INVENTION

This invention relates to a local conditioning induction-type apparatus employing primary inlet air as a power means for controlling temperature. In particular the present invention relates to a local conditioning induction-type apparatus for conditioning systems with four pipes of the secondary water and wherein the temperature is controlled by varying the secondary air flow passing through the heat-exchangers and a by-pass section, having valve assemblies for varying said air flow which are actuated by the same primary inlet air, at the usual feeding pressure of such air.

It is known that the induction-type conditioning apparatus for systems with four pipes of the secondary water essentially comprise a plenum chamber (possibly provided with a silencer) where primary air is fed at a pressure usually in a range of values from 15 to 100 $Kg/m^2$; a row of nozzles wherein this pressure is converted into kinetic energy and then velocity; two water-/air heat-exchangers, one fed by cooled water and the other by hot water; a by-pass section; valve assemblies for guiding the secondary air sucked from the room into a chamber which is placed downstream of the nozzles exclusively through either of the heat-exchangers, or the by-pass section only, the whole being constructed and connected so as to form a single unit.

It is also known that such conditioning apparatus use, for controlling the valve assemblies guiding the secondary air flow, actuators which may be pneumatic, electro-magnetic or electronic. When pneumatic actuators are used, one or more compressors compress air at a pressure of 70,000–80,000 $Kg/m^2$ within suitable reservoirs from which compressed air, upon filtering, drying and pressure releasing to about 11,000 $Kg/m^2$ is fed to all the control devices, in this specific case thermostats, by means of copper, steel or plastic material tubes. Air outflows from each thermostat at a pressure variable in a range from 0 to 1,100 $Kg/m^2$ and the value of the varying pressure is a function of the temperature sensed by the thermostat, which in turn is connected with one or more actuators through other tubes, usually of copper or plastics. A compression station is therefore necessary and also a distribution system for the compressed air, with rather high costs of installation and operation.

Electric or electronic actuators are seldom used, due to their high prime cost and delicacy: on the other hand also in this case an electric feed line and connections between thermostats and actuators are required.

SUMMARY OF THE INVENTION

Therefore it is an object of the present invention to provide a conditioning apparatus which overcomes the above-mentioned inconveniences of the control devices of pneumatic, electric and electronic type previously described, said conditioning apparatus having a control device of the pneumatic type, but employing as motor fluid the same primary air fed into the plenum chambers of the induction apparatus, at the relatively low pressure usually employed, that is comprised in a range of values from about 15 to about 100 $Kg/m^2$.

With such a low pressure of the motor fluid when compared with the pressure in a conventional automatic control device, it is not possible the use of the common thermostats and actuators. Therefore it is another object of the present invention to provide control devices capable of operating at pressure values as usually employed in feeding primary air to the induction apparatus.

The induction-type conditioning apparatus according to the invention, comprising valve assemblies for varying the secondary air flow through the heat-exchangers and the by-pass section, is characterized by the fact that each valve assembly associated with a heat exchanger is actuated by an expansion lung fed by the inlet primary air through a valve controlled by a thermostatic device, there being provided means adapted to connect the valve assembly of the by-pass section with the valve assemblies of the heat-exchangers and interlocking means for preventing secondary air from passing contemporarily through the two heat-exchangers.

The main advantage of the conditioning apparatus of the invention is given by the fact that, in comparison with the prior art apparatus, an air compression station and a distribution line of the compressed air are no more necessary for the temperature control device in the case of pneumatic control. On the other hand there is neither necessity of electric or electronic actuators and relative conductors for the connection with the thermostat in case of this type of control, thus highly reducing the cost of the apparatus itself.

BRIEF DESCRIPTION OF THE DRAWINGS

The conditioning apparatus of the invention will be now fully described with reference to a preferred embodiment thereof, given by way of example, with the aid of the annexed drawings, in which.

DETAILED DESCRIPTION OF THE PREFERRED EMBODIMENT

Figure 1:
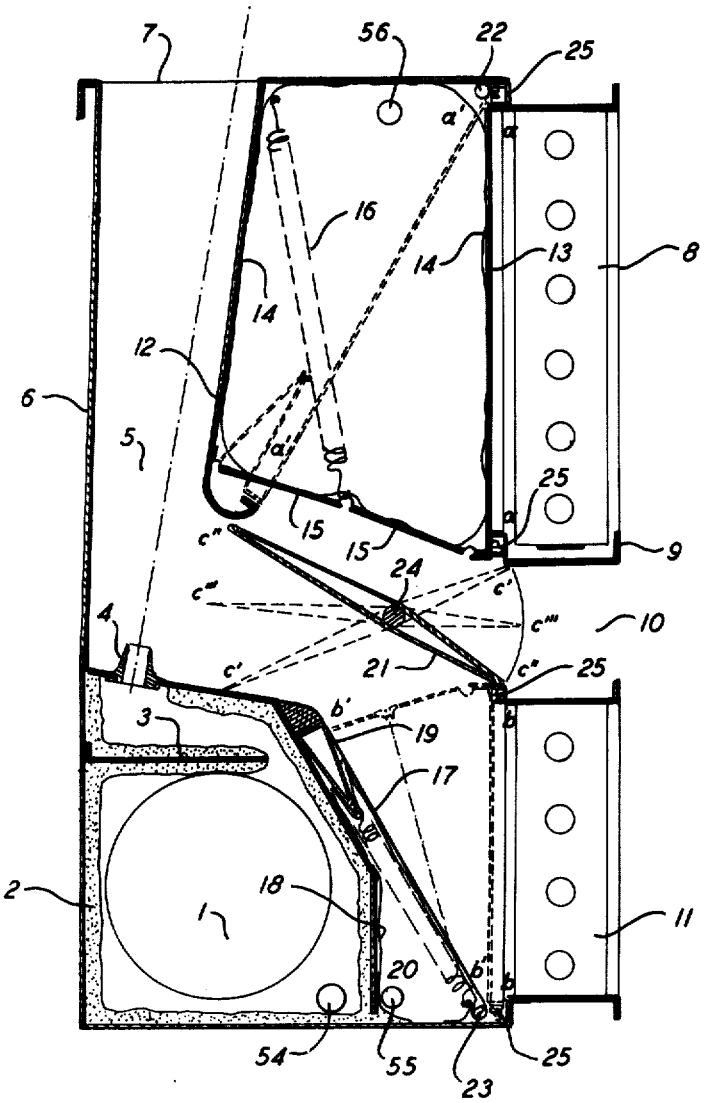
FIG. 1 is a cross-sectional view of an embodiment of the conditioning apparatus according to the invention.

With reference to FIG. 1, a local conditioning induction-type apparatus for a four-pipes conditioning system having a temperature control by means of variation of the secondary air flow passing through two heat-exchangers and a by-pass section comprises a plenum chamber 1 of the primary air possibly provided with deadening panels 2, 3 and air-jet nozzles 4. In these nozzles the potential energy of the primary air (static pressure) is converted into kinetic energy in the chamber 5 downstream of the nozzles, where a low pressure zone is created. The rear panel for closing the apparatus is indicated by 6 and 7 is the top outlet of the mixture of primary and secondary air, sucked through one of the heat-exchangers 8, 11 and/or the by-pass section 10 by means of the depression within chamber 5. The upper heat-exchanger 8 will be preferably that for cooling the secondary air and is provided with a water trap 9, while the heat-exchanger 11 is preferably for heating the secondary air. There is also provided an inner baffle 12 for improving the induction properties of the apparatus.

The valve assembly for controlling the inlet of secondary air through the heat-exchanger 8 has reference number 13, and 14 is the corresponding expansion lung having a protective bellows 15, while 16 is the reference number of at least one return spring of the valve assembly 13. Similarly 17 is the valve assembly for controlling the inlet of secondary air passing through the heat-exchanger 11, provided with an actuating lung 18 and corresponding protective bellows 19, as well as one or more return springs 20.

The by-pass section 10, through which passes the secondary air without being treated, is also provided with a valve assembly 21 rotatably mounted on a pivot 24; similarly the valve assembly 13 is mounted on a pivot 22 and the valve assembly 17 on a pivot 23. Air-tight seal gaskets have been referred to by 25.

It is obvious that the so far described structure of the conditioning apparatus, substantially known except for the valve assemblies actuating lungs and their auxiliary equipment, is not the object of the present invention and may be varied by employing different embodiments or other arrangements of the parts forming the apparatus itself. For example in another possible embodiment the by-pass section could be eliminated as will be explained later on.

Figure 2C:
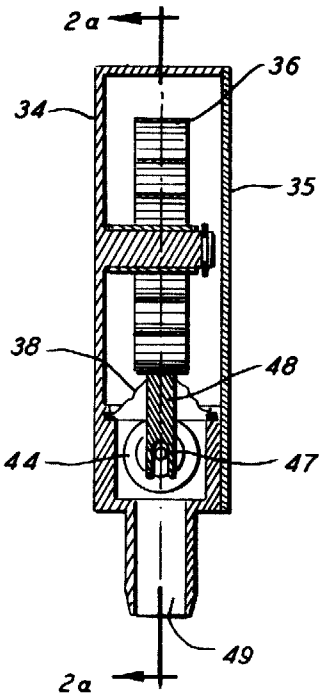
FIGS. 2a, 2b, 2c are cross-sectional views, respectively along lines A—A, B—B, C—C of a thermostat of the conditioning apparatus of FIG. 1.
Figure 2B:
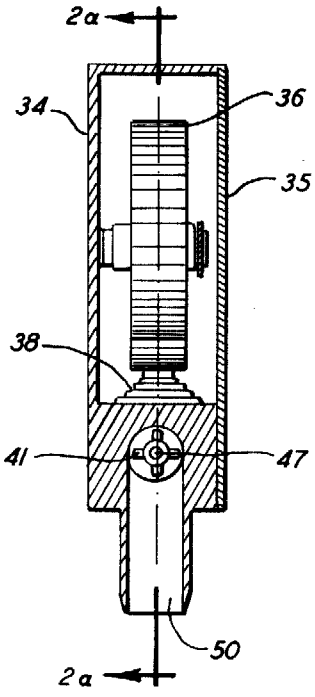
Figure 2A:
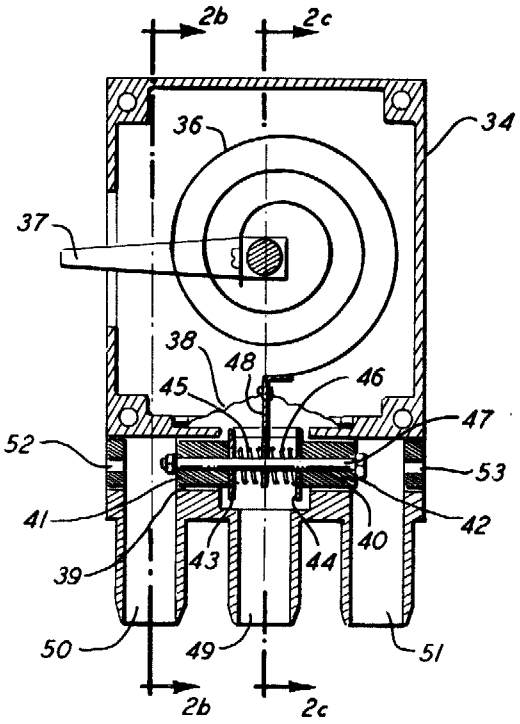

According to the present invention each expansion lung 14, 18 communicates with one of the three ports of a thermostat shown in FIGS. 2a, 2b, 2c. This thermostat substantially comprises a casing 34, a cover 35, a temperature responsive element such as a bimetallic spiral 36 with calibration device 37, a seal bellows 38 of plastic material and two pneumatic valves 39, 40. Each valve 39, 40 comprises respectively a ribbed slide guide 41, 42, a shutter 43, 44 and a return spring 45, 46 for elastically taking up the further stroke of the thermostatic element when the shutter is closed. The two shutters 43, 44 slide within the two ribbed guides 41, 42 along and pin 47 an are actuated by a control yoke 48 rigidly connected to the bimetallic spiral 36. The valve 39 communicates with a port 50 having laterally a the aperture 52, while to the valve 40 corresponds a port 51 having a lateral vent aperture 53. There is also provided a port 49, common to the both valves, which is connected through a tube of rubber or plastics with the plenum chamber 1 of primary air through a fitting 54 (FIG. 1). Port 50 is instead connected with the lung 14 of the heat-exchanger 8 through a fitting 56 (FIG. 1) and port 51 with lung 18 of the heat-exchanger 11 through a fitting 55 (FIG. 1).

At rest, both the pneumatic valves 39, 40 are open in the position represented at FIG. 2a, thereby the primary air from the port 49 feeds at the same time both the lungs 14, 18 which thus maintain the valve assemblies 13, 17 in a closed position. Therefore the secondary air is prevented from passing through the heat-exchangers 8, 11 while the by-pass valve assembly 21 is in the position c'''—c''' shown by phantom lines at FIG. 1. At this stage the air flow from the two ports 52, 53 is lower than that entering the two valves.

Figure 3:
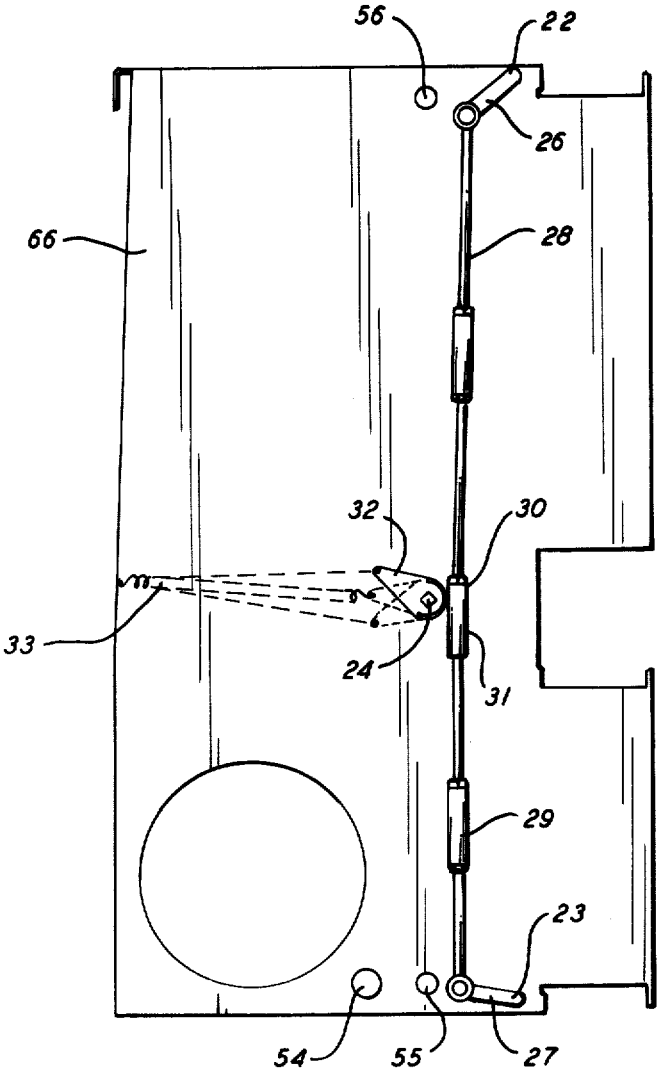
FIG. 3 is a diagrammatic side view of the apparatus, showing in particular the linkage interconnecting the valve assemblies of the heat-exchangers and of the by-pass section.
Figure 4A:
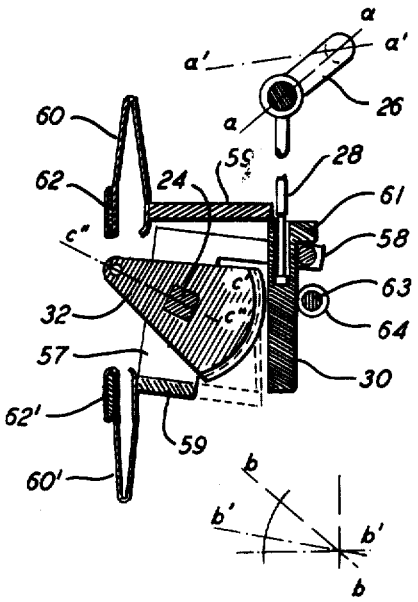
FIGS. 4a to 4e show some details of the linkage of FIG. 3.
Figure 4B:
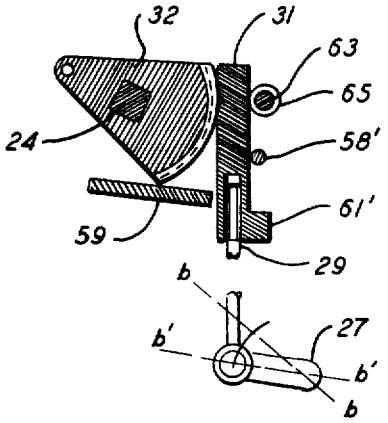
Figure 4C:
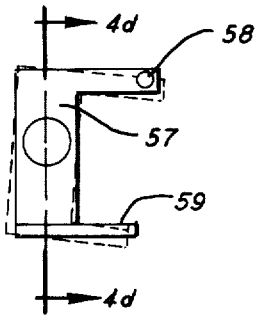
Figure 4D:
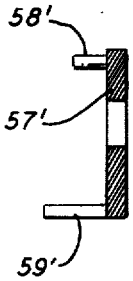
Figure 4E:
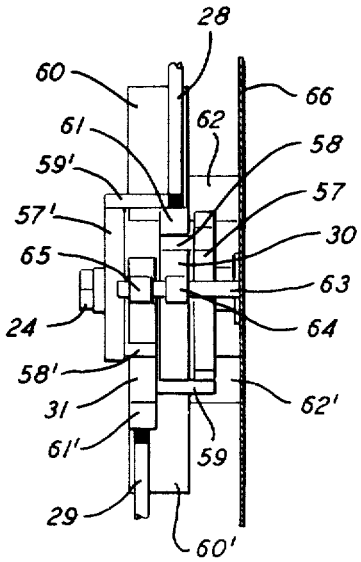

The by-pass valve assembly 21 is connected with the valve assemblies 13, 17 by means of a linkage an embodiment of which is shown by way of example at FIGS. 3 and 4. This linkage has the function of allowing the by-pass valve assembly 21 to be actuated either by the valve assembly 13 alone or by the valve assembly 17 alone, at the same time locking the other valve assembly until the one which is in movement reaches its stop position, corresponding to the complete interruption of the passage of secondary air through the relative heat-exchanger.

With reference to FIG. 3, there is shown a side view of the apparatus, namely of the left side from the point of view of the heat-exchanger and by-pass section side. The pivots 22, 23 for the rotation of valve assemblies 13, 17 are provided with two cranks 26, 27 which are fixedly connected, through two rods 28, 29 of adjustable length, with two racks 30, 31. The racks, by engagement with a sector gear 32, fixedly mounted on the pivot 24 for the rotation of the by-pass valve assembly, cause the latter to rotate. The spring 33 has the function of maintaining at a rest position the by-pass valve assembly 21, which position corresponding to the complete open position C'''—c''' (see FIG. 1).

With reference to FIGS. 4a–4e, the interlocking device between valve assemblies 13, 17 is shown more in detail. On the same pivot 24 of the sector gear 32 two levers 57, 57' are keyed, which are identical and symmetric with respect to the pivot itself, each of them being formed with a pawl 58, 58' and a projecting part or bracket 59, 59'. Each lever, which is illustrated in detail in a side view at FIG. 4c and in cross-section along line D—D at FIG. 4d, under the action of a spring 60, 60' respectively is kept in such a position whereby the bracket 59, 59' engages with the end portion of the rack 31, 30 respectively, thus preventing any movement thereof. Only when pawl 58, 58' is engaged by the tooth 61, 61' respectively of the rack 30, 31 the lever 57, 57' overcomes the action of the spring 60, 60' respectively of the rack 30, 31 the lever 57, 57' overcomes the action of the spring 60, 60' respectively and rotates around its axes disengaging the bracket member 59, 59' from the end of the rack 31, 30 respectively. One of the racks 31, 30 is so allowed to slide and therefore the valve assembly 17, 13 to which the lever 57, 57' is linked through the rods 28, 29 and the cranks 27, 26, is caused to rotate.

At the above described rest position, both the cranks 26, 27 are in position a—a and b—b (FIGS. 4a, 4b), corresponding to both the valve assemblies closed, and the pawls of the two levers are both engaged by the teeth of the racks, which therefore are allowed to slide.

It is to be noted that 62, 62' are referred to the supports of respectively springs 60, 60', rigidly fixed to the side 66 of the apparatus. Two rollers 64, 65, mounted on a shaft 63 ensure the contact between sector gear 32 and racks 30, 31 respectively.

Starting from the above described rest situation and supposing that the thermostat detects a decrease of temperature in comparison with that of reference and also supposing that heat exchanger 8 is the cooling one while heat-exchanger 11 is the heating one, the bimetallic element 36 biases the yoke 48 so that the latter, by compressing the spring 46, moves the shutter 44 to the right-hand gradually closing the inlet of primary air to the port 51, until shutter 44 engages the head of the right end of pin 47. At the same time the shutter 43 is also moved to the right-hand completely opening the port 50. A portion of the air within lung 18 of the heat-exchanger 11 (high temperature), through fitting 55 and a tube for the connection with port 51 (not represented), discharges through vent aperture 53. Therefore the pressure in the lung 18 decreases and the valve assembly 17 of the heat-exchanger 11, under the action of return spring 20 gradually opens the passage of secondary air through the same heat-exchanger (high temperature). The rotation of the valve assembly 17 towards the open position causes the counterclockwise rotation of the crank 27, the downwards movement of the rod 29 and the rack 31 connected therewith, the clockwise rotation of the sector gear 32 and therefore of the by-pass valve assembly 21. As soon as the rack 31 starts with the downward movement, the tooth 61' stops engaging the pawl 58' of the lever 57' thus allowing the bracket member 59' to lock the rack 30, linked to the valve assembly 13 of the heat-exchanger 8 (low temperature) through the rod 28 and the crank 26.

Thus, while at rest both the racks can slide and therefore both the valve assemblies can open, as soon as one of them moves from the closed position, this immediately prevents any movement of the other. This is provided in spite of the impossibility that during the usual operation both the valves will be contemporarily caused to close, as explained hereabove, but in view of avoiding that the opening of both the valve assemblies occurs due to incidental rude movements, e.g. a manual knock. In full heating stage, port 51 is completely closed, lung 18 at the atmospheric pressure, valve assembly 17 at the position b'—b' of FIG. 1, that is completely open, corresponding to the position b'—b' of the crank 27 (FIG. 4b), by-pass valve 21 at the position c''—c'', that is completely closed, and valve assembly 13 at the position a—a of FIG. 1, that is completely obstructing the passage of air through the low-temperature heat-exchanger.

Of course the opposite occurs if the thermostat, with respect to the reference value, detects an increase of temperature until reaching the full cooling stage wherein valve assembly 13 is in a position of complete opening a'—a', by-pass valve assembly 21 closed at c'—c' and valve assembly 17 completely closed at the position b—b.

The three valve assemblies can obviously have all the intermediate positions from the full heating stage to the full cooling stage, because the position of the two pneumatic valves of the thermostat, the air passing therethrough and flowing from the two ports 52, 53 give rise to variable pressure conditions within the two lungs with the consequence that the valve assemblies can cover all the intermediate positions with interlocked movements, but in such a manner that while valve 13 moves from a'—a' to a—a, by-pass valve moves from c''—c'' to c'''—c''' and subsequently while valves 17 moves from b—b to b'—b', by-pass valves moves from c'''—c''' to c'—c'. The actuation of the valve assemblies by means of the primary air at the relatively low pressure employed by induction-type systems is possible due to the large contact surfaces existing between lungs and valve assemblies, which are essentially given by the whole surface of the valves themselves, to the fact that the valve assemblies rotate on anti-friction bearings, and to the very low difference of pressure between the two surface of the control valve assemblies.

It is to be understood that the by-pass section is not absolutely necessary and it may be eliminated, as stated above, as well as the valve assemblies 21 and the linkage shown at FIGS. 3 and 4. In this case the function carried out by the by-pass section when the valves assemblies 13, 17 are in such a position to shut off the heat-exchangers, occur at the outlet 7 because primary air flowing from the nozzles 4 has still as much kinetic energy as to cause room air to be sucked. The kinetic energy of the primary air is substantially the same throughout the apparatus unit, from the nozzle 4 to the outlet 7 due to the fact that there is no passage of air through the two heat-exchangers, closed by the valve assemblies.

It is further to be appreciated that the induction apparatus of the present invention may be shipped from the production to the installation place with the plenum chamber and expansion lungs, thus reducing further installation time and costs. Furthermore only one thermostat can control a plurality of conditioning apparatus which causes the setting up costs to be substantially reduced.

Additions and/or modifications may be made by those skilled in the art to the above described and illustrated embodiment of the induction-type local conditioning apparatus of the present invention without departing from the scope and spirit thereof. In particular it will be possible to modify the arrangement and number of the elements forming the apparatus such as plenum chamber, heat-exchangers, controlling valves and by-pass section, the last being possibly missing, as previously stated.

What I claim is:

1. An induction-type air conditioning system of the type employing first heat exchanger means for cooling air, second heat exchanger means for heating air and a respective pair of pipes for each heat exchanger means to conduct temperature-treated fluid to and from said heat exchanger means, said system comprising:

a housing;

a source of primary air including plenum means located in said housing for conducting said primary air, and nozzle means for issuing a primary air stream from said plenum means;

means defining an air flow passage in said housing, *with* said [air flow] passage being positioned to receive the primary air stream from said nozzle means and to direct said primary air stream externally of said housing;

means defining an aspiration opening into said air flow passage *with* said [aspiration] opening being oriented to permit secondary air to be aspirated therethrough by said primary air stream flowing in said air flow passage;

means defining first, second and third air inlets into said housing, said first heat exchanger means being positioned in the path of said first air inlet to cool air entering said housing via said first air inlet, said second heat exchanger means being positioned in the path of said second air inlet to heat air entering said housing via said second air inlet, said third air inlet serving as a by-pass inlet to permit entry of untreated air into said housing;

first actuable damper means movable between extreme opened and closed positions to proportion air inflow through said first air inlet and having a front surface configured to block air flow through said first air inlet when said first damper means is in its closed position, said first damper means also including a rear surface;

first bias means for continuously urging said first damper means towards [its] *a selected one of said* opened [position] *or closed positions;* a first actuator compartment located in said housing and defined on at least one side by the rear surface of said first damper means;

first inflatable and expansible actuator means disposed in said first *actuator* compartment for urging said first damper means towards [its] *said other of said* opened [position] *or closed positions* to a degree determined by the degree of inflation of said first actuator means;

second actuable damper means movable between extreme opened and closed positions to proportion air inflow through said second air inlet and having a front surface configured to block air flow through said second air inlet when said second damper means is in its closed position, said second damper means also including a rear surface;

second bias means for continuously urging said second damper means towards [its] *a selected one of said* opened [position] *or closed positions;* a second actuator compartment located in said housing and defined on at least one side by the rear surface of said second damper means;

second inflatable and expansible actuator means disposed in said second compartment for urging said second damper means towards [its] *said other of said* opened [position] *or closed positions* to a degree determined by the degree of inflation of said second actuator means;

control means for controllably inflating and deflating said first and second actuator means with primary air, said control means including thermostatic valve means responsive to the temperature in an environment being conditioned by said primary air stream for inflating one and deflating the other of said first and second actuator means with primary air;

third actuable damper means movable to two extreme closed positions through an opened position to proportion air inflow through said third air inlet; *and* linkage means for [connecting] *interconnecting* said first and second damper means to said third damper means [such that said third damper means is in its opened position and permits], *including interlocking means for preventing secondary air from passing contemporaneously through said first and second heat exchangers, and for permitting* maximum air flow through said third air inlet when both of said first and second damper means are closed.

2. The system according to claim 1 wherein said thermostatic valve means includes first and second valves connected to receive primary air through a common feeding port, said valves having respective outlet ports connected in parallel and feeding said first and second inflatable actuators, respectively, said valves being arranged so that at least one of said outlet ports is open at any time to feed said primary air to inflate its associated inflatable actuator and thereby [close] *place* the corresponding one of said first and second damper means *in its selected other position,* said system further including bias means for maintaining said first and second damper means [open] *in their selected one position* when the associated inflatable actuator is deflated, whereby contemporaneous opening of both said first and second damper means is prevented.

3. The system according to claim 2 wherein said first and second valves each [includes] *include* a vent aperture for discharging primary air from the associated inflatable actuator when said each valve is closed, thereby causing the associated one of said first and second damper means to [open] *be placed in its selected one position.*

4. The system according to claim 3 wherein said thermostatic valve means is responsive to a predetermined reference temperature in the environment being conditioned for partially opening both said first and second valves, whereby said first and second actuators maintain said first and second [damper means closed] *dampers in their other of said positions,* the rate of air discharge from said vent apertures being less than the rate of primary air flow through said common feeding port.

5. The system according to claim 1 wherein said thermostatic valve means is responsive to the temperature in said conditioned environment being less than a predetermined reference temperature for [blocking] *controlling* air inflow to said second inflatable actuator, whereby secondary air flows through said second heat exchanger means, and wherein said thermostatic valve means is responsive to the temperature in said conditioned environment being greater than said predetermined reference temperature for [blocking] *controlling* primary air inflow to said first inflatable actuator whereby secondary air flows through said first heat exchanger means.

6. The system according to claim 1 further comprising means for biasing said third actuable damper means in an open rest position, said third actuable damper means being rotatably mounted for rotation between two closed positions which are symmetrically disposed relative to said rest position.

7. A local conditioning induction-type apparatus for conditioning systems with four pipes of secondary water, comprising:

first and second heat exchangers, each arranged to have said secondary water flowed therethrough via a respective pair of said four pipes;

a by-pass flow section located between said first and second heat exchangers;

a primary air flow section through which primary air is directed to flow, and including an aspiration opening through which secondary air flow is aspirated by primary air flow;

first and second damper means for controlling the temperature of said primary air flow for controlling secondary air flow to said aspiration opening through said first and second heat exchangers, respectively;

third damper means for controlling the temperature of said primary air flow by controlling secondary air flow to said aspiration opening through said by-pass flow section;

first and second expansion lung actuator means for alternatively opening and closing said first and second damper means, respectively;

thermostatically controlled valve means for conducting primary air to inflate said first and second expansion lung means in response to temperature conditions in an environment being conditioned by said primary air;

connecting means linking said first and second damper means to said third damper means for controlling the position of said third damper means in accordance with the positions of said first and second damper means; and interlock means for preventing secondary air from passing contemporarily through said first and second heat exchangers;

wherein said third damper means is biased open at a rest position by a return spring and is rotatably mounted on a pivot about which it is rotatable between two closed positions symmetrically disposed relative to said rest position; and wherein said connecting means comprises a sector gear rigidly mounted on said rotation pivot of said third damper means, which sector gear meshes at the same time with two racks, each rack being connected with one of said first and second damper means, said interlock means being provided for preventing any one of said racks from moving when the other rack is operated by the movement of the associated damper means.

8. An apparatus according to claim 7, wherein said interlock means comprises two identical and symmetric levers [pivotedly] *pivotally* mounted on the same rotation pivot of said sector gear, each lever having a pawl adapted to be engaged by one of said racks and a bracket means adapted to engage an end of the other rack, both said levers being capable of rotating against the action of contrasting spring means as said pawl of one lever is engaged by a tooth of the associated rack, thereby disengaging said bracket means from the other rack.

9. An apparatus according to claim 7, wherein said racks are connected with said first and second damper means by means of rods having adjustable length and cranks mounted on the rotation pivots of the same damper means.

* * * * *